Patented Mar. 24, 1953

2,632,777

UNITED STATES PATENT OFFICE 2,632,777

PRODUCTION OF HYDROCARBON CONJUNCT POLYMERS

Herman Pines, Chicago, Ill., assignor to Universal Oil Products Company, Chicago, Ill., a corporation of Delaware No Drawing. Application January 6, 1949, Serial No. 69,595

2 Claims. (Cl. 260—666)

This invention relates to a process for the production of high molecular weight, polycyclic, polyolefinic hydrocarbons, herein referred to as conjunct polymers, which are suitable for use as hydrocarbon drying oils and as intermediates for the production of resins and other products requiring highly unsaturated, non-aromatic hydrocarbons as starting material. The invention concerns more specifically the production of said conjunct polymers from a hydrocarbon mixture comprising olefinic hydrocarbons and saturated polycyclic hydrocarbons by reacting said mixture with a conjunct polymerization catalyst, hereinafter more specifically defined, and also concerns a process for recovering said conjunct polymers from a sludge intermediate product formed during the so-called conjunct polymerization reaction by specific methods of sludge decomposition.

It has heretofore been recognized by the art that certain unsaturated hydrocarbons, selected from the olefinic and cyclo-olefinic hydrocarbons, as well as certain saturated branched chain aliphatic hydrocarbons containing more than three carbon atoms per molecule may be reacted with a limited class of catalytic agents, generally characterized as acid-acting inorganic compounds selected from the Friedel-Crafts metal halides and the mineral acids at reaction conditions specified as conjunct polymerization reaction conditions, to form a sludge-like material as one product of the reaction and a saturated hydrocarbonaceous materials as the other product. When utilizing aliphatic and monocyclic olefinic hydrocarbon charging stocks in the conjunct polymerization reaction heretofore employed by the prior art, the ultimate mixture of unsaturated hydrocarbons recoverable from the sludge by decomposition thereof, consists of monocyclic hydrocarbons, generally having a cyclopentene structure with alkenyl and alkapolyenyl side chains attached to the cyclic nucleus, the unsaturation of many of the polyenic linkages being conjugated. The mixture of hydrocarbons comprising the total product recovered from the sludge contains at least 20% by weight, up to about 40%, of hydrocarbon components boiling below about 300° C. which, when utilized for drying oil purposes, readily evaporate on exposure to atmospheric oxygen, due to their low molecular weight. The portion of the mixture which does not evaporate but undergoes the polymerization—oxidation reactions believed to be the mechanism of the so-called "drying" process, in general, dry to form brittle, non-elastic films either shortly after exposure to atmospheric oxygen or upon extended, exposure and "drying." The product of the prior art process was, therefore, largely unsatisfactory for drying oil purposes, for example, as the drying oil component of paint and varnish compositions. By means of the process of this invention, on the other hand, a mixture of conjunct polymers is formed, the individual components of which have high molecular weights, are relatively non-volatile at the usual atmospheric conditions and dry upon exposure to atmospheric oxygen to a tough, non-brittle film, particularly desirable in the formulation of coating compositions. It is thus one of the principal objects of the present invention to provide a process for the manufacture of hydrocarbon drying oils having relatively high molecular weight and which dry upon exposure to oxygen to form an abrasion-resistant, non-tacky film, particularly suitable as the drying oil component of coating compositions. Another object of the present invention is to provide a process for the manufacture of polycyclic, polyolefinic hydrocarbons containing conjugated and non-conjugated unsaturation which have utility not only as said hydrocarbon drying oils but which, in addition, are valuable as resin intermediates, as plasticizers, and for many other uses in which polycyclic hydrocarbons containing conjugated unsaturation are particularly desirable.

One embodiment of the invention relates to a process for the production of polycyclic, non-aromatic hydrocarbons containing conjugated and non-conjugated unsaturation which comprises reacting a mixture of polycyclic saturated hydrocarbons and olefins with a conjunct polymerization catalyst at temperature and pressure conditions sufficient to maintain the reaction mixture substantially in liquid phase, thereafter separating a lower sludge phase containing a predominant proportion of the conjunct polymerization catalyst originally charged from the upper, substantially saturated hydrocarbon phase formed in the reaction, and decomposing said sludge phase under such conditions as to retain the polycyclic, polyolefinic structure of the hydrocarbons contained in said sludge phase bound to the catalyst.

A more specific embodiment of the present invention relating to one of the preferred methods of operating the present process concerns the production of polycyclic, polyolefinic hydrocarbons containing conjugated and non-conjugated unsaturation which comprises reacting a mixture of mono- and poly-olefinic hydrocarbons and polycyclic saturated hydrocarbons with a conjunct polymerization catalyst consisting of substantially anhydrous hydrogen fluoride at a temperature of from about 0° to about 150° C. and at a pressure sufficient to maintain substantially liquid phase, to thereby form a two-phase reaction mixture, an upper layer comprising predominantly saturated hydrocarbons and a lower layer sludge containing a predominant proportion of the the hydrogen fluoride catalyst charged to said reaction, separating said layers and contacting the hydrogen fluoride layer with an inert liquid diluent maintained at a temperature of from about 100° to about 200° C. to decompose the hydrogen fluoride-polycyclic, polyolefinic sludge complexes and to vaporize the hydrogen fluoride therefrom. Other objects and embodiments of the present process relating to specific reactants, particular methods of operation and other variables of the process will be hereinafter described with greater detail in the following further description of the invention.

The mechanism of the reaction believed to be responsible for the formation of polyolefinic cyclic hydrocarbons containing conjugated and non-conjugated unsaturation by the conjunct polymerization of a mixture of polycyclic hydrocarbons and olefinic hydrocarbons is considered to be a combination of various species of different hydrocarbon reactions referred to in the aggregate as a conjunct polymerization reaction. Upon contact of a mixture of polycyclic saturated hydrocarbons and olefinic hydrocarbons with the conjunct polymerization catalyst, a hydrogen transfer reaction occurs between the hydrocarbons whereby some of the hydrogen atoms of the polycyclic saturated hydrocarbon component of the reaction mixture are transferred to the olefinic, and/or polyolefinic hydrocarbon components of the reaction mixture. Substantially simultaneous with the hydrogen transfer reaction, it is believed that polymerization, cyclization, and alkylation reactions also occur within the reaction mixture of catalyst and hydrocarbons to form a mixture of unsaturated hydrocarbon homologues comprising alkyl, alkenyl, and alkapolyenyl cyclic and polycyclic hydrocarbons in which the olefinic unsaturation is both conjugated and non-conjugated as one product of the reaction and the corresponding saturated hydrocarbons having a similar cyclic structure as the other product of the reaction. The unsaturated conjunct polymer product becomes bound by weak chemical bonds to the conjunct polymerization catalyst to form the sludge hereabove referred from which they may be recovered by the special methods for decomposing the catalyst-hydrocarbon complexes in the sludge hereinafter referred to. The saturated conjunct polymers, the recipients of the hydrogen transferred during the conjunct polymerization reaction remain free and independent in the reaction mixture of catalyst, hydrocarbons and sludge formed as the result of the conjunct polymerization reaction and rise to the top of the heavier sludge layer to form a separate phase hereinabove referred to as the upper layer hydrocarbon phase. The lower sludge layer is thereafter separated from the upper hydrocarbon layer, for example, by decantation, preferably washed with a suitable extracting solvent, such as a low molecular weight liquid paraffin to remove dissolved and/or entrained saturated conjunct polymers therefrom, and subjected to a sludge decomposition reaction as hereinafter described to recover therefrom the polyolefinic, cyclic conjunct polymers desired for utilization as the ultimate product of the reaction.

The unsaturated hydrocarbon component of the charging stock to the conjunct polymerization reaction is a mixture of mono- and/or polyolefinic hydrocarbons containing at least three carbon atoms per molecule, in which aromatic hydrocarbon components are preferably maintained at a minimum. Suitable sources of such charging stocks include certain olefinic hydrocarbon fractions containing cyclic or acyclic olefins having at least three up to about 12 carbon atoms per molecule, such as propylene, a mixture of butylenes, the pentenes, the octenes, etc., a gasoline boiling range fraction of a thermally cracked petroleum distillate, or a fraction containing relatively low molecular weight olefin polymers, such as a propylene dimer, trimer or tetramer, or a butylene polymer such as the trimer or dimer. One of the preferred sources of the unsaturated component of the charging stock to the conjunct polymerization reaction is an olefinic codimer gasoline fraction formed by the mixed polymerization of propylene and butylene containing $C_6$ to $C_{10}$ olefins. A particularly desirable class of unsaturated hydrocarbons utilizable in the conjunct polymerization reaction comprises the cyclic and acyclic polyolefinic hydrocarbons, such as the dienes and trienes. Since the unsaturated hydrocarbon reactant serves in the conjunct polymerization reaction principally as hydrogen acceptor from the polycyclic, saturated hydrocarbon reactant, the presence of the polyolefin in the reaction mixture results in greater unsaturation of the ultimate conjunct polymer product and tends to reduce the proportion of unsaturated hydrocarbons required as charging stock by virtue of the greater total number of unsaturated bonds in the reaction mixture capable of accepting hydrogen when utilizing polyolefins than when utilizing an equivalent number of moles of mono-olefins. Suitable polyolefinic hydrocarbons as charging stock include such compounds as butadiene, pentadiene, cyclopentadiene, cyclohexadiene etc., which may be charged to the reaction in admixture with the polycyclic, saturated hydrocarbon reactant or together with a mono-olefin and said polycyclic hydrocarbons.

The saturated polycyclic hydrocarbon component of the charging stock to the conjunct polymerization reaction is generally obtained from suitably boiling fractions of gas oil or a kerosene distillate. A mixture of polycyclic saturated hydrocarbons may also be utilized in the present process such as a fraction of a gas oil distillate containing several individual components. Fractions, for example, containing decahydro-phenanthrene, perhydro-anthracene, decahydro-naphthalene, decahydro-acenaphthalene, perhydro-phenanthrene, perhydro-pyrene, pinane, fenchane, camphane, and hydrindane comprise suitable charging stocks in the present process. When a mixture of hydrocarbons of polycyclic structure are utilized in the conjunct polymerization reaction, derived for example, from a gas oil charging stock, the individual hydrocarbons have a wide variety of structures, some of which have not been as yet identified, but which contribute to the formation of the present product. Suitable gas oil charging stocks may boil, for example, from about 250° to about 500° C. In the use of the polycyclic saturated hydrocarbons derived from petroleum fractions as charging stock, certain colored components may also be contained therein, especially the high-boiling fractions which, if charged to the reaction, may appear in the final product from which they are difficult to remove. Since it is preferable to produce a product as nearly colorless as possible for use in paint and varnish compositions, it is generally preferred not to utilize charging stocks containing said colored components or otherwise to treat the fraction to remove these undesirable components prior to utilization in the process.

As heretofore noted, the conjunct polymerization reaction produces two distinct products: a lower layer reaction product comprising the aforementioned sludge containing polyolefinic, cyclic hydrocarbons which become attached by weak chemical bonds to the conjunct polymerization catalyst and an upper layer reaction product consisting of substantially saturated hydrocarbons similar in structure to the conjunct polymers contained in said sludge, except for their saturated character. Some components of the upper layer product, especially the higher boiling fractions thereof (for example, fractions boiling above about 300° C.), consist of polycyclic saturated hydrocarbons which are utilizable as the saturated, polycyclic component of the charging stock herein provided in the conjunct polymerization reaction. When utilized in this capacity, some of the hydrogen atoms in the molecular structure of said saturated conjunct polymers are transferred to the olefinic or polyolefinic hydrocarbons in the charging stock during the conjunct polymerization reaction and thereby are converted to the desired polyolefinic, cyclic hydrocarbon product contained in the sludge. In this manner, it becomes possible to convert almost the entire original charge of hydrocarbons to the desired polyolefinic, cyclic hydrocarbon product—that is, by recycling the polycyclic saturated components of the upper layer to the conjunct polymerization reaction.

Catalytic agents utilized in the present process to effect conjunct polymerization between the saturated, polycyclic hydrocarbon and an unsaturated cyclic or alicyclic hydrocarbon containing olefinic, or polyolefinic unsaturation are generally characterized as acid-acting inorganic substances, such as a mineral acid or certain Friedel-Crafts halides, such as anhydrous aluminum bromide and aluminum chloride and boron trifluoride. Suitable mineral acids include sulfuric acid of at least about 90% concentration, and hydrofluoric acid containing less than about 10% by weight of water, preferably, substantially anhydrous hydrogen fluoride. Recycle hydrogen fluoride released from a hydrogen fluoride sludge in the thermal or catalytic method of decomposing said sludge, as hereinafter described with reference to one method of recovering the unsaturated conjunct polymers therefrom, may be employed as catalyst in the conjunct polymerization reaction, since the decomposition may be effected at such conditions as to yield a recovered hydrogen fluoride effluent containing from about 98 to 100% hydrogen fluoride. Because of the latter feature of recovering and recycling the hydrogen fluoride catalyst by thermally or catalytically decomposing the hydrogen fluoride sludge, and because of the ability to recover generally superior polyolefinic cyclic hydrocarbon products containing a maximum in conjugated and non-conjugated unsaturation, hydrogen fluoride is generally preferred in the production of the sludge intermediate product from which said polyolefinic cyclic hydrocarbons are recovered by the present process.

The sludge-forming stage or conjunct polymerization reaction of the present process is effected by contacting the mixture of saturated polycyclic hydrocarbons and unsaturated cyclic or alicyclic hydrocarbons of the aforementioned composition with the conjunct polymerization catalyst at a temperature within the range of about 0° to about 200° C., preferably from about 30° to about 150° C. and at a super-atmospheric pressure sufficient to maintain the reactants and catalyst in substantially liquid phase. The temperature conditions for each of the above classes of conjunct polymerization catalysts may vary depending upon the characteristics of the catalyst. For example, temperatures in the lower range of the above limits are utilized when sulfuric acid is employed as catalyst because of the oxidizing tendency of sulfuric acid at temperatures above about 100° C., the preferred reaction temperature for sulfuric acid being within the range of from about 0° to 100° C. A somewhat broader range of reaction temperatures, however, may be utilized when employing hydrogen fluoride or an aluminum halide as the conjunct polymerization catalyst, for example, temperatures of from about 0° to about 250° C., preferably from about 30° to about 150° C. An optimum yield of sludge is obtained, which, when decomposed in accordance with the methods herein provided yields a drying oil having a desired degree of unsaturation for the particular charging stock utilized, when the weight ratio of hydrocarbon charging stock to conjunct polymerization catalyst charged to the reaction zone is maintained within the range of from about 1.5 to about 4.5, although this may be varied depending upon the charging stock and catalyst utilized in the reaction. The molal ratio of polycyclic saturated hydrocarbons to the olefinic hydrocarbon charging stock is preferably maintained within the range of from about 0.5 to 1 to about 5 to 1, in order to provide a suitable ratio of hydrogen donor and hydrogen acceptor hydrocarbon components in the conjunct polymerization reaction mixture.

At the above reaction conditions and when the reaction mixtures of hydrocarbons and catalyst is mixed by some form of stirring device, sludge formation takes place immediately, and the reaction may be allowed to continue for one or more hours to obtain maximum production of the sludge. The increment of yield, however, becomes progressively smaller as the reaction time is increased and it is generally not practical to prolong the reaction for longer than about one-half hour. The liquid sludge phase and the upper layer saturated hydrocarbon phase formed during the reaction, separated on standing, and the separate phases may be recovered by decanting the upper hydrocarbon phase from the lower catalyst-hydrocarbon sludge phase.

The mixture of conjunct polymers or polyolefinic, cyclic hydrocarbons is recovered from the sludge by any suitable method, depending upon the catalyst utilized in the formation of the sludge, although certain procedures provide advantages in operation which are not common to the other presently known methods of slude decomposition. One of such methods, applicable to any of the conjunct polymerization catalyst sludges hereinabove referred to, results in the production of a highly unsaturated product but reduces the concentration of the recovered catalyst phase making it uneconomical to recover the catalyst for recycling purposes to the sludge-forming stage. This method which comprises hydrolyzing the sludge in an aqueous medium is effected by thoroughly mixing the sludge with water or a dilute alkali solution. During the hydrolysis, the unsaturated hydrocarbons released from the sludge form a separate phase and rise to the top of the mixture, while the water soluble or water-hydrolyzable catalyst enters the aqueous phase. In the case of the aluminum halides, the aqueous hydrolysis procedure hydrolyzes the catalyst chemically so that even by evaporation of the water, the original dehydrated aluminum halide cannot be recovered as such. In the case of the sulfuric acid and hydrogen fluoride conjunct polymerization catalysts, the water merely hydrolyzes the catalyst-conjunct polymer complex and the hydrated catalyst may be recovered from the aqueous phase by removing the water therefrom. The hydrolytic method, however, entails certain disadvantages; attending the high cost of the recovery procedure for reconcentrating the acid, for example, these methods also require the use of acid-resistant equipment, not only in the aqueous hydrolysis step, but also in the distillation equipment for reconcentrating the aqueous acid and for converting the concentrate to anhydrous acid.

The ability to readily recover the conjunct polymerization catalyst in a nearly anhydrous state by means of an inexpensive procedure constitutes one of the chief advantages in the use of hydrogen fluoride as catalyst, since hydrogen fluoride may be readily vaporized from the sludge, cooled and reliquefied for recycling purposes. The decomposition stage of the process for recovery of the polyolefinic, cyclic hydrocarbons from the sludge may thus be effected by merely heating the sludge until the hydrogen fluoride component thereof is removed by vaporization, leaving a hydrocarbonaceous residue in which the component hydrocarbons contain more or less unsaturation, depending upon the distillation time and conditions. The latter thermal decomposition method, however, as may be expected from the known catalytic activity of free anhydrous hydrogen fluoride, yields an inferior hydrocarbon product containing few, if any, conjugated olefinic bonds, which are desired in the product for use as a drying oil and residue intermediate. The thermal decomposition method, however, may be modified to provide a method in which many of the disadvantages associated with the simple thermal decomposition obviated. Such modified procedures involve decomposing the sludge in the presence of a sludge decomposition catalyst or in the presence of an inert liquid diluent which dissolves the liberated sludge hydrocarbons immediately upon decomposition and removes them from contact with the free hydrogen fluoride. In the catalytic decomposition method, the hydrogen fluoride sludge at a temperature of from about 50° to about 250° C. is charged into a reactor column packed with a catalytic material which enhances the decomposition of the sludge but retards the cracking and polymerization of the conjunct polymers released therefrom. The hydrogen fluoride vapors, having a purity of from about 98 to 100% hydrogen fluoride, depending upon the temperature of operation, are taken overhead and condensed in auxiliary coolers, while the higher boiling conjunct polymer hydrocarbons are removed from the catalytic decomposition column as a bottoms fraction. The effective catalysts utilizable as packing materials in the catalytic decomposition column comprise certain metals which are resistant to corrosion by free hydrogen fluoride, and certain forms of carbon and metallic fluoride or oxyfluoride salts. Among the preferred catalysts for effecting the decomposition, copper and cobalt as well as certain brasses containing copper, lead, and tin have been found to be some of the most effective in obtaining decomposition of the sludge and recovery of the hydrocarbon product in which the components contain a maximum of conjugated and non-conjugated unsaturation.

In the thermal decomposition method involving introduction of the hydrogen fluoride sludge into a liquid pool or inert diluent, the diluent is maintained at a temperature sufficient to decompose the sludge and vaporize the hydrogen fluoride released upon decomposition of the sludge thereby and separating the hydrogen fluoride vapors from the liquid hydrocarbon phase in the reactor. The temperature maintained in the reactor, is on the other hand, sufficiently below the boiling point of the conjunct polymer hydrocarbon product to permit very little of the latter hydrocarbons to flash into the hydrogen fluoride vapor outlet. Suitable inert liquids into which the hydrogen fluoride sludge may be charged in accordance with the thermal decomposition method comprise the inert hydrocarbons such as a paraffin or mixture thereof such as a naphtha boiling from about 50° to about 180° C., preferably from about 100° to 140° C. Such hydrocarbons include the octanes, nonanes, decanes, or a mixture thereof such as a fraction of a straight run gasoline boiling in the above range. Other inert diluents include the haloalkanes such as bromo- or chlorohexane and various inorganic compounds such as salts, melting below the above desired temperature range of operation and which are chemically stable to hydrogen fluoride. The heat of vaporization of the hydrogen fluoride and the heat of decomposition may be supplied in the decomposition zone by maintaining the inert diluent under reflux in a reboiler attached to the decomposition column and allowing the hydrogen fluoride sludge to come into direct contact with the hot vapors from the reboiling section. It is also desirable to introduce a light inert gas into the decomposition zone or below the point at which the hydrogen fluoride sludge undergoes decomposition to carry the hydrogen fluoride vapors rapidly from the decomposition zone. As an aid in the decomposition of the hydrogen fluoride complexes, the light inert carrier gas may be heated to the approximate decomposition temperature, or higher, prior to its contact with the sludge in the decomposition zone of the reactor. Typical inert gases utilizable as a carrier for the hydrogen fluoride from the decomposition zone include such paraffinic hydrocarbons as butane, pentane, hexane, etc., and inorganic inert gases such as nitrogen, carbon dioxide, carbon monoxide, etc. The latter gases are generally separated from the hydrogen fluoride effluent by condensing the inert gas or the hydrogen fluoride therefrom, depending upon the boiling point of the gas, and recycling the separated gas into the process flow.

The mixture of inert liquid diluent and polyolefinic cyclic hydrocarbon or conjunct polymer hydrocarbon product contained in the reboiler section of the decomposition column may be distilled while the latter mixture is retained in the decomposition column, the vapors of the lower boiling inert diluent carrying latent heat into the decomposition zone of the column, or the entire mixture may be alternatively transferred to a separate distillation zone to fractionate the inert liquid diluent from the conjunct polymer hydrocarbon product and/or to separate the product into distinct fractions boiling over any particular range suitable for a specific purpose. The distillation or fractionation is desirably conducted at sub-atmospheric pressures to decrease the boiling point of the conjunct polymer hydrocarbon product and thereby reduce the tendency of such hydrocarbons to polymerize at higher temperatures required for distillation.

The conjunct polymer hydrocarbon product or mixture of polyolefinic cyclic hydrocarbons comprises a number of hydrocarbon homologues. Infra-red and ultra-violet absorption studies, as well as other analytical data determined on the recovered conjunct polymers, have indicated that the individual hydrocarbons comprising the mixture of recovered conjunct polymers are cyclic, although substantially non-aromatic, have isolated unsaturation in addition to conjugated unsaturation and the four carbon atoms constituting the conjugated system are highly substituted, possessing, on the average, fewer than 2 hydrogen carbon atoms per molecule as substituents. The hydrocarbon mixture boils from about 150 to well over 450° C. at atmospheric pressure, have bromine numbers above about 140 to about 200, maleic anhydride valves of from about 30 to about 100, an average number of olefinic bonds per molecule of from about 2.5 to about 4.5 of which a large percentage thereof are conjugated as indicated by the high diene value, and molecular weights as high as about 1000. The unsaturation in the alkenyl and alkapolyenyl substituents attached to the cyclic portion of the hydrocarbons are in many instances in conjugation with the unsaturation contained in the cyclic portion of the molecule.

The conjunct polymer hydrocarbon product of the present invention containing conjugated as well as non-conjugated unsaturation have special utility in the manufacture of drying oils, paints, varnishes, lacquers, shellac substitutes, and other protective coatings and for this purpose they may be mixed with varying proportions of natural glyceride drying oils or utilized independently in the composition of said products. Besides being a particularly desirable drying oil, the products of the present process may be utilized in the preparation of resins and plastics and a variety of synthetic organic compounds. The hydrocarbons, for example, by virtue of the conjugated unsaturation in their structure may be condensed with dienophilic acid anhydrides such as maleic, itaconic and mesaconic acid anhydrides (or other derivatives) to form higher molecular weight acids or derivatives thereof. In addition, the hydrocarbons may be halogenated to form insecticidal compositions or converted into detergents, siccatives, etc.

The following examples are introduced for the purpose of illustrating the results obtainable by the process of the present invention, but the data therein should not be construed to limit the scope of the invention in accordance therewith.

*Example I.*—A mixture of 276 grams of decahydro-naphthalene (2.0 mols) and 96 grams of methylcyclohexene (1.0 mol) was added to a stirred autoclave containing 130 grams of anhydrous liquid hydrogen fluoride and the contents stirred for 1.3 hours at temperatures of from about 82° to about 89° C. The mixture was thereafter allowed to stand quiescent until it separated into two layers. 293 grams of the resulting upper layer was decanted from the lower sludge layer; it consisted mostly of saturated hydrocarbons, a portion of which represented unreacted decahydronaphthalene charging stock and the remaining portion contained high molecular weight saturated conjunct polymers and methylcyclohexane.

The lower layer of the above reaction mixture weighing 176 grams was added to 500 grams of ice and the mixture stirred until hydrolysis of the sludge was complete. An upper hydrocarbon layer separated from the aqueous hydrofluoric acid phase as hydrolysis proceeded; it was decanted from the aqueous layer and reserved. 46 grams of unsaturated conjunct polymers was recovered in this manner. The hydrocarbons distilled over a temperature range of from about 265° C. to over 430° C. and the maleic anhydride values varied from about 69 for the higher boiling fractions to over 100 for the initial and intermediate fractions. These hydrocarbons when spread in a thin film approximately 0.0020" thick and exposed to atmospheric oxygen at 77° C. dried to a hard film in less than 24 hours and the film was not brittle after 28 days on test.

The upper layer mixture of hydrocarbons separated from the sludge formed in the initial conjunct polymerization reaction contained 52 grams of methylcyclohexane, indicating that the methylcyclohexene reactant charged to the conjunct polymerization reaction acted as hydrogen acceptor in the hydrogen transfer reaction involved in said conjunct polymerization to yield the corresponding saturated cycloparaffin.

*Example II.*—A mixture of 276 grams of decahydro-naphthalene (2.0 mols) and 70 grams of 2-pentene (1.0 mol) was added to a stirred autoclave containing approximately 200 grams of anhydrous hydrogen fluoride in liquid phase and the contents stirred for 1.4 hours at temperatures of from about 79° to about 98° C. The mixture was thereafter allowed to stand quiescent until it separated into two layers. 272 grams of upper layer was decanted from the lower sludge layer, and consisted mostly of saturated hydrocarbons of which a portion comprised decahydro-naphthalene and another portion consisted of 34 grams of isopentane and normal pentane.

The lower sludge layer of the above reaction mixture, weighing 247 grams, was added to 700 grams of ice and the mixture stirred until hydrolysis of the sludge was complete. An upper hydrocarbon layer separated from the lower acidic sludge layer as hydrolysis continued which was decanted and reserved. 46 grams of unsaturated conjunct polymers was recovered in this manner, having a boiling range of from about 238° to over 448° C., maleic anhydride values (for the various fractions over the boiling range) of from about 68 for the highest boiling fractions to well over 100 for the initial and intermediate boiling fractions. A fraction boiling from about 407° to about 417° C., having a maleic anhydride value of approximately 76, when spread in a thin film on a tin test panel and exposed to atmospheric oxygen dried hard in less than 24 hours, but became slightly brittle after approximately 11 days of test.

I claim as my invention:

1. A process for the production of polyolefinic polycyclic hydrocarbons containing conjugated and non-conjugated unsaturation which comprises forming a reaction mixture substantially free of aromatic hydrocarbons and comprising two molar proportions of decahydronaphthalene and one molar proportion of an olefinic hydrocarbon, subjecting said mixture to conjunct polymerization in the presence of a conjunct polymerization catalyst at a temperature of from about 0° to about 200° C. to form a catalyst-hydrocarbon sludge, separating said sludge from saturated hydrocarbon reaction products, and thereafter decomposing said sludge to recover therefrom said polyolefinic, polycyclic hydrocarbons.

2. The process of claim 1 further characterized in that the conjunct polymerization catalyst is substantially anhydrous hydrogen fluoride and in that the catalyst-hydrocarbon sludge is decomposed by hydrolysis thereof.

HERMAN PINES.

REFERENCES CITED

The following references are of record in the file of this patent:

UNITED STATES PATENTS

| Number | Name | Date |
|---|---|---|
| 1,878,963 | Michel | Sept. 20, 1932 |
| 2,334,099 | Ipatieff et al. | Nov. 9, 1943 |
| 2,470,894 | Johnstone | May 24, 1949 |

FOREIGN PATENTS

| Number | Country | Date |
|---|---|---|
| 835,152 | France | Dec. 14, 1938 |